(12) United States Patent
Myers et al.

(10) Patent No.: US 10,095,287 B2
(45) Date of Patent: Oct. 9, 2018

(54) ADJUSTMENT OF DEVICE OPERATIONS BASED ON AN ENCLOSURE

(71) Applicant: Apple Inc., Cupertino, CA (US)

(72) Inventors: Scott A. Myers, Cupertino, CA (US); Ihtesham H. Chowdhury, Cupertino, CA (US); Richard Hung Minh Dinh, Cupertino, CA (US); Benjamin J. Pope, Cupertino, CA (US); Matthew D. Hill, Cupertino, CA (US); Dhaval N. Shah, Cupertino, CA (US); Martin J. Auclair, Waterloo (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/815,278

(22) Filed: Jul. 31, 2015

(65) Prior Publication Data
US 2017/0031398 A1    Feb. 2, 2017

(51) Int. Cl.
| | |
|---|---|
| *H04M 1/00* | (2006.01) |
| *G06F 1/20* | (2006.01) |
| *H04M 1/02* | (2006.01) |
| *H04M 1/725* | (2006.01) |
| *G06F 1/16* | (2006.01) |
| *G06F 1/18* | (2006.01) |

(52) U.S. Cl.
CPC ............ *G06F 1/206* (2013.01); *G06F 1/1628* (2013.01); *G06F 1/1656* (2013.01); *G06F 1/182* (2013.01); *H04M 1/026* (2013.01); *H04M 1/72563* (2013.01); *G06F 2200/1633* (2013.01); *G06F 2200/1634* (2013.01)

(58) Field of Classification Search
CPC ......... G06F 3/0412; G06F 2203/04104; G06F 3/041; G06F 3/0488
USPC ....................................... 455/575.8
See application file for complete search history.

(56) References Cited

U.S. PATENT DOCUMENTS

| | | | |
|---|---|---|---|
| 2011/0090626 A1* | 4/2011 | Hoellwarth | B29C 45/14639 361/679.01 |
| 2013/0076614 A1* | 3/2013 | Ive | G06F 1/1677 345/156 |
| 2014/0240253 A1* | 8/2014 | Choi | G06F 3/044 345/173 |

(Continued)

FOREIGN PATENT DOCUMENTS

| | | |
|---|---|---|
| CN | 102884841 A | 1/2013 |
| CN | 103988151 A | 8/2014 |

(Continued)

OTHER PUBLICATIONS

PCT/US2016/044752, "International Search Report and Written Opinion", dated Nov. 7, 2016, 11 pages.

(Continued)

*Primary Examiner* — Tu X Nguyen
(74) *Attorney, Agent, or Firm* — Kilpatrick Townsend & Stockton LLP (57) ABSTRACT

An electronic device is configured to detect the presence or absence of a case that is positioned over at least one surface of the electronic device. When a case is present, the electronic device is configured to determine one or more characteristics of the case and adjust one or more operations of the electronic device based on at least one characteristic of the case.

24 Claims, 8 Drawing Sheets

(56) References Cited

U.S. PATENT DOCUMENTS

| | | | |
|---|---|---|---|
| 2014/0333431 A1* | 11/2014 | Abdelsamie | H04M 1/0283 340/539.11 |
| 2015/0031347 A1* | 1/2015 | Kim | H04M 1/0245 455/418 |
| 2015/0043156 A1* | 2/2015 | Jain | H04M 1/72575 361/679.46 |
| 2015/0062104 A1* | 3/2015 | Choy | H04M 1/0283 345/207 |
| 2015/0156614 A1* | 6/2015 | Chi | H04M 19/04 455/414.1 |
| 2015/0162515 A1* | 6/2015 | Shiu | H01L 35/32 455/575.8 |
| 2015/0270734 A1* | 9/2015 | Davison | H02J 7/0054 320/103 |
| 2015/0301561 A1* | 10/2015 | Carnevali | G06F 1/1628 455/575.8 |
| 2015/0323963 A1* | 11/2015 | Tokutake | G06F 1/1677 345/173 |

FOREIGN PATENT DOCUMENTS

| | | |
|---|---|---|
| CN | 203840653 U | 9/2014 |
| KR | 20150020997 A | 2/2015 |
| WO | 2014128338 A1 | 8/2014 |
| WO | 2015030869 | 3/2015 |
| WO | 2015047363 | 4/2015 |

OTHER PUBLICATIONS

Chinese Utility Model Patent Application No. 201620810623.X, "Evaluation Report of Utility Model Patent", dated Aug. 3, 2017, 6 pages.

* cited by examiner

ADJUSTMENT OF DEVICE OPERATIONS BASED ON AN ENCLOSURE

FIELD

The described embodiments relates generally to electronic devices. More particularly, the present embodiments relate to adjusting one or more operations of an electronic device based on at least one characteristic of an enclosure that is placed about the electronic device.

BACKGROUND

Electronic devices, such as cellular phones, digital media players, and portable computing devices, typically have a variety of accessories that a person can use with the electronic device. One such accessory is a protective case, which is often used to protect the electronic device against contaminants, impacts, and collisions. Protective cases can be made from a variety of materials, such as metal, plastic, rubber, polycarbonate, and leather. Some types of protective cases can block or obstruct an aperture or input mechanism in an electronic device. For example, a protective case can cover an audio or headset port, a touch input device, or speakers. In some situations, the type of material of the protective case, or the obstruction of an aperture or input mechanism, can undesirably affect an operation of the electronic device.

SUMMARY

In one aspect, an electronic device can include one or more device components that are disposed within the electronic device and/or in, on, or over at least one surface of the electronic device. The one or more device components are configured to mate with corresponding case component(s) within a case and/or on or over a surface of the case when the case is placed about the electronic device. A processing device in the electronic device may be configured to determine one or more characteristics of the case when at least one device component is mated with a corresponding case component. The processing device is configured to adjust one or more operations and/or characteristics of the electronic device based on at least one characteristic of the case. For example, the one or more characteristics of the case can include the material of the case, a device, input mechanism, or output mechanism in the electronic device that is obstructed by the case, and/or a device, input mechanism, or output mechanism in the electronic device whose operation is degraded by the presence of the case. Any suitable operation or characteristic of the electronic device can be adjusted based on at least one characteristic of the case.

In one example embodiment, a thermal management operation of the electronic device can be changed based the material of the case. For example, a thermal threshold of the electronic device may be increased when the case, or the portion of the case that contacts the user, is made of (or includes) a material that has a lower thermal conductivity. Increasing the thermal threshold allows the maximum or desired operating temperature of the electronic device to increase. Alternatively, the maximum or desired operating temperature of the electronic device can be lowered when the case, or the portion of the case that contacts the user, is made of material that has a higher thermal conductivity.

In another example embodiment, the operation of an audio device may be adjusted when a case obstructs the speakers and/or degrades the operation of the speakers. For example, the volume can be increased during audio playback. Additionally or alternatively, the frequency spectrum of the audio playback can be shifted away from the frequencies that are attenuated by the presence of the case.

In another aspect, an electronic device can include at least one device component and a case may include at least one corresponding case component. A method of operating the electronic device can include determining the presence of the case when the case is positioned over at least one surface of the electronic device. Optionally a case type can be determined based on the detected presence of the case. One or more characteristics of the case may be determined based on the detected presence of the case and/or on the identified case type. One or more operations and/or characteristics of the electronic device can be adjusted based on at least one characteristic of the case.

In some embodiments, the electronic device can receive a signal from a case component in the case. This allows the electronic device to detect the presence of the case, to identify the type of case, and/or to determine one or more characteristics of the case. For example, a wireless transceiver in the case can transmit a signal to a network communication interface in the electronic device. A processing device operably connected to the network communication interface may then receive the signal. The signal may include identification data for the case and/or one or more characteristics of the case.

Additionally or alternatively, the electronic device may detect the presence of a case by detecting when at least one device component in the electronic device mates with at least one corresponding case component in the case.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As disclosed herein, an electronic device can be configured to adjust one or more operations and/or characteristics of the electronic device based on at least one characteristic of a case positioned about the electronic device. The electronic device may be configured to detect the presence or absence of the case, to identify the type of case when a case is placed about the electronic device, and/or to determine one or more characteristics of the case. For example, a characteristic of the case may be the material in the case. Additionally or alternatively, information about whether the case obstructs a device or impacts the operation of a device in the electronic device, such as an input/output device or a sensor, can be determined.

In another embodiment, an electronic device can receive signals from the case. The electronic device can detect the presence of the case based on the receipt of at least one signal. Additionally or alternatively, the signals can include identifying information about the case and/or one or more characteristics of the case. For example, a case may include a wireless transceiver that is configured to transmit signals to an electronic device when the case is placed over at least one surface of the electronic device.

For example, in one embodiment, the electronic device can adjust the thermal management operations of the electronic device when the material of the case is a material that has a lower thermal conductivity. The operating temperature of the electronic device can increase since the body part of the user (e.g., a hand) that contacts the electronic device and the case may not feel or detect the increased level of heat being generated by the electronic device.

In another non-limiting example, the electronic device can adjust the volume or frequency spectrum of the audio based on the material of the case and/or the case at least partially impeding the speakers in the electronic device. The volume can be increased and/or the frequency spectrum of the audio playback shifted to improve the quality of the audio playback. Alternatively, the electronic device may disable the speakers while the case is on the electronic device.

In another illustrative embodiment, the electronic device may adjust the operation of a touch device based on the type of case and/or the material of the case. For example, if the case is, or includes, a cover that is positioned over the display, and the display includes a touchscreen, the electronic device can decrease a touch threshold, or an amount of touch, that is needed to register a touch on the touch screen. In other words, the operations of the touchscreen can be adjusted to make the touchscreen more sensitive to touch inputs. Alternatively, if the case is, or includes, a transparent cover or film, the electronic device can adjust the brightness and/or contrast of the display while the case is on the electronic device. Alternatively, if the case includes an opaque cover that is positioned over the display, the electronic device may disable the display and/or a touch device in or adjacent to the display (e.g., put in a sleep state) while the case is on the electronic device.

In another non-limiting example, an electronic device can adjust the operation of a vibrator or haptic device based on the type of case and/or the material of the case. Input parameters such as the frequency, amplitude, or signal for the haptic device may be changed based on the case. For example, the frequency, amplitude, and/or signal can be adjusted to increase the haptic output when the case is a thick silicone case compared to a thinner hard shell case. Thus, the haptic output experienced by a user can feel substantially the same regardless of the type of case on the electronic device.

As used herein, the term "operation" includes both an operation of an electronic device and a characteristic of an electronic device. For example, operations or characteristics of an electronic device include, but are not limited to, the brightness of a display, a volume level of audio playback, an on-off state of an audio device in the electronic device, power consumption, and the output level (e.g., strength) of a haptic output.

Additionally, as used herein, the term "case" includes a removable enclosure, a case, a cover, a pouch, a sleeve, a holster, a clip, and the like for an electronic device. A case may partially or fully cover or enclose an electronic device. In some embodiments, a case can primarily protect the electronic device from various elements or events, such as contaminants, water, impacts, and collisions. Additionally or alternatively, a case can be decorative or ornamental to permit a user to individualize the electronic device and display the user's style or interests.

These and other embodiments are discussed below with reference to FIGS. 1-9. However, those skilled in the art will readily appreciate that the detailed description given herein with respect to these Figures is for explanatory purposes only and should not be construed as limiting.

Figure 1A:
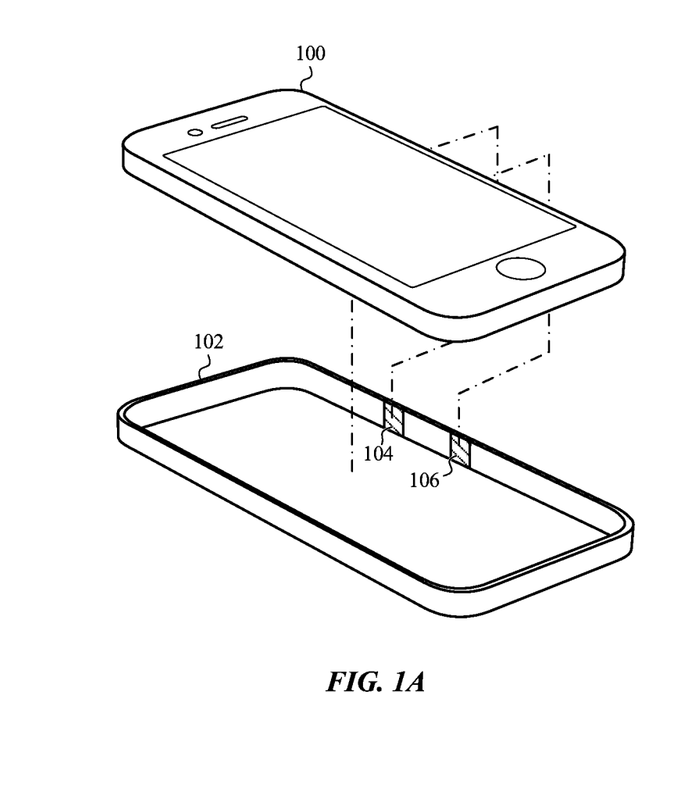
FIGS. 1A and 1B are side perspective views of a first example of an electronic device and a case.
Figure 1B:
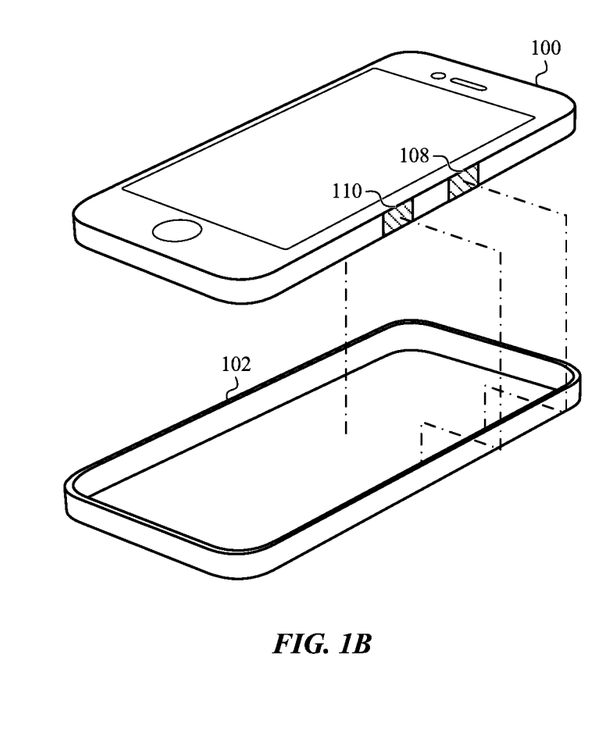

Referring now to FIGS. 1A and 1B, there are shown side perspective views of a first example of an electronic device and a case. The electronic device 100 is shown as a cellular phone. However, any suitable type of electronic device may be used in other embodiments. For example, the electronic device can be to a portable computer such as a laptop or tablet computer, a wearable electronic device such as a health monitoring device or a watch, or a handheld device such as a digital assistant, a digital media player, and a portable game player.

The electronic device 100 and the case 102 are shown in an unmated state. The case 102 is configured to partially enclose the electronic device 100. In a non-limiting example, the case 102 includes two case components 104, 106 positioned on or over a side or a surface within the case 102. The electronic device 100 includes two device components 108, 110 located within the electronic device 100 or on or over a side or surface of the electronic device 100. At least one of the device components 108, 110 is positioned and configured to mate, connect, contact, communicate, and/or sense a corresponding case component 104, 106. Although two case components 104, 106 and two device components 108, 110 are shown in FIGS. 1A and 1B, any suitable number of case components and device components may be used in other embodiments. Additionally, the number of case components and the number of device components may be the same or may differ. As one example, an electronic device may include more device components than the number of case components included in a case. Additionally, in other embodiments, the device components and the case components can be positioned substantially anywhere on the electronic device and on the case.

Each case component 104, 106 and each device component 108, 110 may be an electrical component, a mechanical component, a thermal component, a magnetic component, or an electromechanical component. For example, each case component 104, 106 and each device component 108, 110 may be a conductive contact, a connector, an electronic device, circuitry (e.g., electrical component, integrated circuit), a sensor, and/or an electrical substrate (e.g., printed circuit board, flexible circuit). The case components 104, 106 can be partially or completely integrated into the case 102. Similarly, the device components 108, 110 can be partially or completely integrated into the electronic device 100.

In one embodiment, a case component 104, 106, may be an electrical contact, a mechanical key or projection, a wireless communication interface (e.g., a transceiver), a processing device, a sensor, or a haptic device. A device component 108, 110 may be configured to mate, contact, sense, or communicate with a corresponding case component. For example, a device component can be an electrical contact, a port or aperture, a switch, a wireless communication interface, or a sensor (e.g., image sensor).

In one embodiment, when the device components 108, 110 and the case components 104, 106 are in a mated state (e.g., in contact with each other), the electronic device 100 is configured to (i) detect the presence of the case 102, (ii) to determine one or more characteristics of the case when the electronic device 100 detects the presence of the case 102, and/or (iii) to adjust one or more operations of the electronic device 100 based on at least one characteristic of the case 102. The case 102 may be a "dumb" or passive case, in that the case 102 does not actively interact with the electronic device 100 by transmitting signals to, or receiving signals from, the electronic device via a wired or wireless connection.

In another embodiment, the case 102 can be a smart case that actively interacts with the electronic device 100 (e.g., transmit signals to the electronic device). In such embodiments, a case component 104, 106 may transmit one or more signals to the electronic device 100 via a device component 108, 110 to provide data to the electronic device 100. The data can indicate the presence of the case, identify the case type, and/or provide information regarding one or more characteristics of the case 102. For example, the characteristics can include the type of material the case is made of, a thermal property or properties of the case, the position(s) of any openings in the case that correspond to an apertures, input mechanisms, or output mechanisms in the electronic device 100 (e.g., a speaker port, a camera), any apertures, input mechanisms, or output mechanisms obstructed by the case, an input mechanism or an output mechanism whose operation is degraded by the presence of the case, and whether the case is, or includes, a cover that is positioned over the display and type of material in the cover. Alternatively, the signal(s) transmitted by a case component may identify the type of case and the electronic device 100 determines one or more characteristics of the case 102 based on the case identification. The electronic device 100 can then adjust one or more operations of the electronic device 100 based on at least one characteristic of the case 102.

In some embodiments, a smart case can include at least one case component that actively interacts with the electronic device 100 and at least one case component that does not actively interact with the electronic device but is detectable by the electronic device (e.g., one or more conductive contacts, an image or pattern).

Additionally, in some embodiments, the case components can extend the input/output capabilities of the electronic device 100 and/or augment one or more functional characteristics or operations of the electronic device 100. In one embodiment, a case component can be a wireless transceiver, a radio-frequency identification (RFID) chip, a near field communication (NFC) device, or a magnetic component that can interact with an external device. The case component can be a NFC device that extends or augments the operation of a wireless payment system. Additionally or alternatively, a case component can be a magnetic component that extends the operation of a secure access device (e.g., provide identification information to access a secure location or application).

Figure 2:
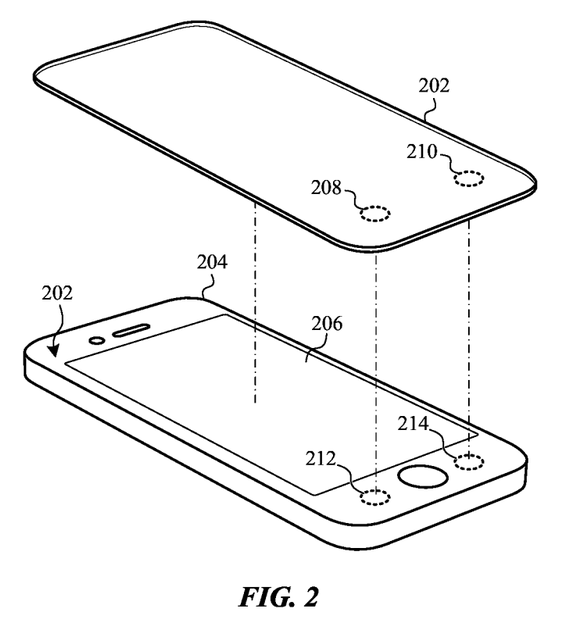
FIG. 2 is a side perspective view of a second example of an electronic device and a case.

FIG. 2 is a perspective view of a second example of an electronic device and a case. In this embodiment, the case 200 is a cover that attaches to the front surface 202 of the electronic device 204. The case 200 may attach permanently or removably to the front surface 202. The case 200 can be made of any suitable material. In one non-limiting example, the case 200 is a transparent cover or film that allows a user to view images displayed on the display 206.

The case 200 includes one or more case components 208, 210 disposed within the case 200, on a side of the case, and/or over a surface of the case 200. The electronic device 204 includes one or more corresponding device components 212, 214 within the electronic device 204, on a side of the electronic device 204, and/or over a surface of the electronic device 204. Like the embodiment shown in FIGS. 1A and 1B, at least one device component 212, 214 is positioned and configured to mate, connect, contact, communicate with, and/or sense a corresponding case component 208, 210. Although two case components 208, 210 and two device components 212, 214 are shown in FIG. 2, any suitable number of case components and device components may be used in other embodiments. Additionally, the number of case components and the number of device components may be the same or may differ. And in other embodiments, the device components and the case components can be positioned substantially anywhere on the electronic device and on the case.

Figure 3:
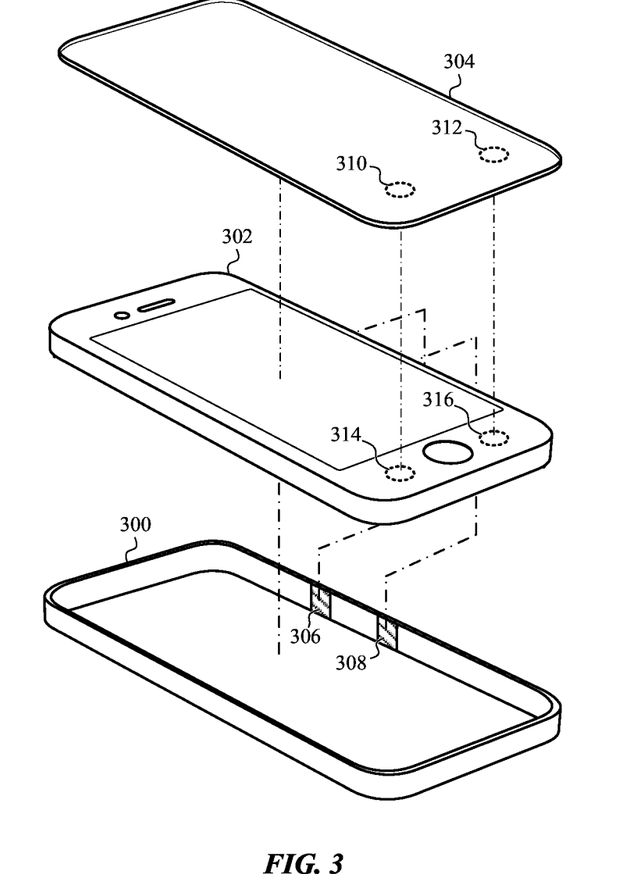
FIG. 3 is a side perspective view of a third example of an electronic device and a case.

FIG. 3 is a perspective view of a third example of an electronic device and a case. In this embodiment, the case includes a body 300 that partially surrounds or encloses the electronic device 302 and a cover 304. The cover 304 may attach to the front surface of the electronic device 302. Alternatively, the cover 304 can be connected to, or part of, the body 300 of the case. In such an embodiment, the cover 304 can slide or fold over the front surface of the electronic device 302.

In some embodiments, the body 300 can include one or more case components 306, 308 and the electronic device may include corresponding device components (not shown in FIG. 3). Additionally or alternatively, the cover 304 can include one or more case components 310, 312 and the electronic device may include corresponding device components 314, 316. Like the embodiments shown in FIGS. 1 and 2, at least one device component is positioned and configured to mate, connect, contact, communicate with, and/or sense a respective case component. In other embodiments, the device components and the case components can be positioned substantially anywhere on the electronic device and on the case. Additionally, any suitable number of case components and device components may be used in other embodiments.

Figure 4:
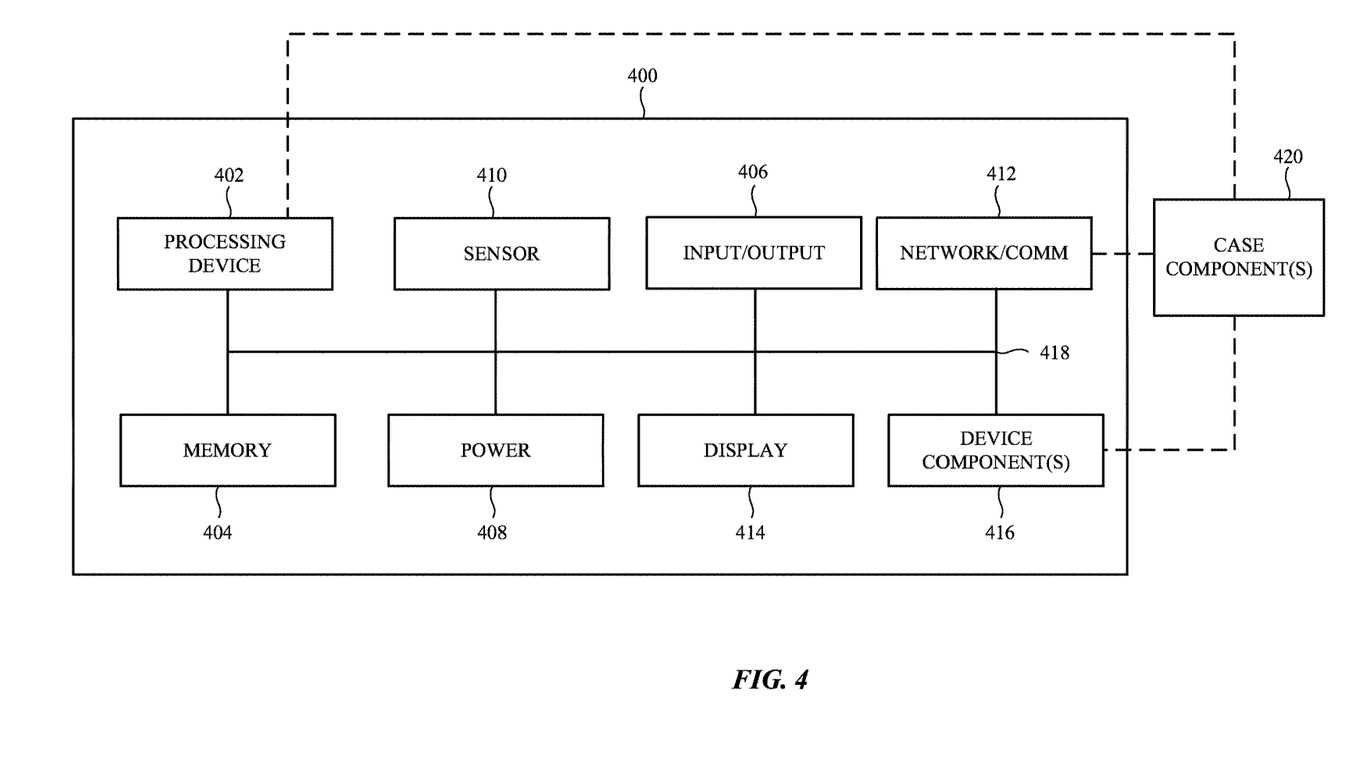
FIG. 4 is a depicts a simplified block diagram of an example electronic device that is suitable for use as the electronic device 100, 202, and 302 shown in FIGS. 1-3.

Referring now to FIG. 4, there is shown a simplified block diagram of an example electronic device that is suitable for use as the electronic device 100, 204, and 302 shown in FIGS. 1-3. The electronic device 400 can include one or more processing devices 402, memory 404, one or more input/output (I/O) devices 406, a power source 408, one or more sensors 410, a network/communication interface 412, a display 414, and one or more device components 416, each of which will be discussed in turn below.

The one or more processing devices 402 can control some or all of the operations of the electronic device 400. The processing device(s) 402 can communicate, either directly or indirectly, with substantially all of the components of the device. For example, one or more system buses 418 or other communication mechanisms can provide communication between the processing device(s) 402, the memory 404, the I/O device(s) 406, the power source 408, the one or more sensors 410, the network/communication interface 412, the display 414, and/or the device component(s) 416. At least one processing device can be configured to determine if one or more operations in the electronic device 400 is to be adjusted based on at least one characteristic of a case positioned about the electronic device 400.

The processing device(s) 402 can be implemented as any electronic device capable of processing, receiving, or transmitting data or instructions. For example, the one or more processing devices 402 can be a microprocessor, a central processing unit (CPU), an application-specific integrated circuit (ASIC), a digital signal processor (DSP), or combinations of multiple such devices. As described herein, the term "processing device" is meant to encompass a single processor or processing unit, multiple processors, multiple processing units, or other suitably configured computing element or elements.

The memory 404 can store electronic data that can be used by the electronic device 400. For example, the memory 404 can store electrical data or content such as audio files, document files, timing and control signals, operational settings and data, and image data. The memory 404 can be configured as any type of memory. By way of example only, memory 404 can be implemented as random access memory, read-only memory, Flash memory, removable memory, or other types of storage elements, in any combination.

The one or more I/O devices 406 can transmit and/or receive data to and from a user or another electronic device. Example I/O device(s) 406 include, but are not limited to, a touch sensing input device such as a touchscreen or track pad, one or more buttons, a microphone, a haptic device, and/or a speaker.

The power source 408 can be implemented with any device capable of providing energy to the electronic device 400. For example, the power source 408 can be one or more batteries or rechargeable batteries, or a connection cable that connects the electronic device to another power source such as a wall outlet.

The electronic device 400 may also include one or more sensors 410 positioned substantially anywhere on or in the electronic device 400. The sensor or sensors 410 may be configured to sense substantially any type of characteristic, such as but not limited to, images, pressure, light, heat, touch, force, temperature, humidity, movement, relative motion, biometric data, and so on. For example, the sensor(s) 410 may be an image sensor, a temperature sensor, a light or optical sensor, an accelerometer, an environmental sensor, a gyroscope, a magnet, a Hall Effect sensor, a health monitoring sensor, and so on.

The network communication interface 412 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, infrared, RFID, Ethernet, and NFC.

In some embodiments, one or more case components 420 can transmit signals to the electronic device 400 for data storage, data or signal processing, and/or to manage one or more operations of the electronic device 400. Similarly, in some embodiments the electronic device 400 can transmit signals to the case component(s) 420 for data storage, data or signal processing, and/or to enable the operations of a case component 420. For example, the case component 420 may be a network communication interface, such as an RFID or NFC device. The processing device 402 in the electronic device 400 can be configured to store and/or process data or signals received from the case component 420 or to determine if one or more operations of the electronic device 400 is to be adjusted based on at least one characteristic of a case that is covering at least a portion of the electronic device 400.

The display 414 can provide a visual output to the user. The display 414 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. In some embodiments, the display 414 can function as an input device that allows the user to interact with the electronic device 400. For example, the display can be a multi-touch touchscreen display.

As described earlier, the one or more device components 416 can be an electrical component, a mechanical component, a thermal component, a magnetic component, or an electromechanical component. For example, a device component may be a conductive contact, a connector, an electronic device, circuitry (e.g., integrated circuit), a sensor, and/or an electrical substrate (e.g., printed circuit board, flexible circuit). At least one device component 416 is configured to mate, contact, sense, or communicate with a corresponding case component 420. In some embodiments, the processing device 402 is configured to detect the presence or absence of a case by detecting when at least one device component 416 is mated with, in contact with, or in communication with, or has sensed a corresponding case component 420. For example, a case component can be circuitry such as a resistor that changes a signal level in the electronic device when the device and case components are in contact. Alternatively, a case component may be a battery or a signal line that completes a circuit when the device and case components are in contact.

It should be noted that FIG. 4 is exemplary only. In other examples, the electronic device may include fewer or more components than those shown in FIG. 4. Additionally or alternatively, the electronic device can be included in a system and one or more components shown in FIG. 4 is separate from the electronic device but in communication with the electronic device. For example, an electronic device may be operatively connected to, or in communication with a separate display. As another example, one or more applications or data can be stored in a memory separate from the electronic device. In some embodiments, the separate memory can be in a cloud-based system or in an associated electronic device.

Figure 5:
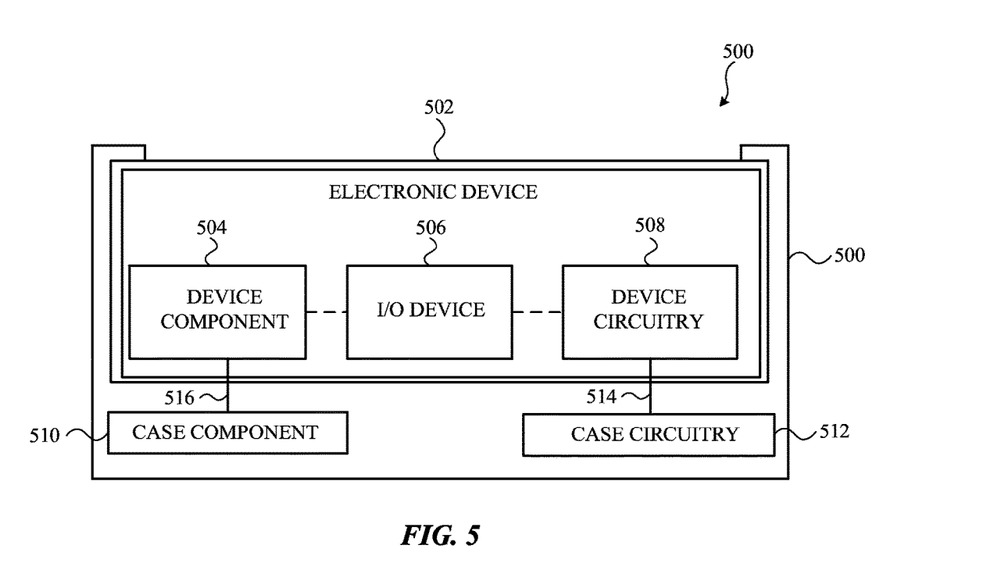
FIG. 5 is a simplified cross-sectional view of an electronic device mated with a case.

FIG. 5 is a simplified cross-sectional view of an electronic device mated with a case. In one embodiment, the case 500 may only partially enclose the electronic device 502, such as the bottom surface, the four side surfaces, and a portion of the top surface of the electronic device (e.g., see FIGS. 1A-1B). In another embodiment, a case may only be a cover (e.g., FIG. 2), or the case may include a cover, which allows the case to enclose the entire electronic device (e.g., FIG. 3). And in yet another embodiment, the case may be a sleeve that the electronic device slides into via an opening in the sleeve.

The electronic device 502 includes a device component 504, an I/O device 506, and device circuitry 508. The device component 504 and the I/O device 506 may communicate with each other, or be connected to each other. Similarly, the device circuitry 508 and the I/O device 506 may communicate with, or be connected to, each other.

The case 500 includes a case component 510 and case circuitry 512. The device circuitry 508 is electrical circuitry associated with the electronic device 502, and the case circuitry 512 is electrical circuitry that is associated with the case 500 for the electronic device 502. In one embodiment, the case circuitry 512 is formed substantially within the case 500. For example, the case circuitry 512 can be molded within the case 500. The case circuitry 512 can be partially or completely internal to the case 500.

The case 500 and the electronic device 502 are configured such that a removable connection can be established between the electronic device and the case. When the removable connection is enabled or effectuated, the electronic device 502 can detect the presence of the case and responsively determine one or more characteristics of the case and adjust at least one operation or characteristic of the electronic device 502 based on the characteristic(s) of the case. The electronic device 502 can detect the absence of the case 500 when the removable connection is disabled.

In one embodiment, a removable connection 514 may be established between the device circuitry 508 and the case circuitry 512. The device circuitry 508 is one type of a device component and the case circuitry 512 is one type of a case component. As one example, a communication link can be established when the device circuitry 508 is a network/communication interface (e.g., 412 in FIG. 4) and the case circuitry 512 is a wireless transceiver. Alternatively, an electrical connection can be provided between the device circuitry 508 and the case circuitry 512. In one example, when the case 500 is placed about the electronic device 502, the device circuitry 508 can include an electrical connector that can receive a counterpart electrical connector in the case circuitry 512, thereby establishing an electrical connection between the device circuitry 508 and the case circuitry 512.

In another embodiment, a removable connection 516 can be established between a device component 504 in the electronic device 502 and a case component 510 in the case 500. The removable connection 516 is enabled when the device component 504 is mated with the case component 510. For example, the device component 504 may be in contact with the case component 510 when the device and case components 504, 510 are conductive contacts or circuitry (e.g., a resistor) and a conductive contact.

In some embodiments, the case 500 can cover or obstruct an I/O device 506 when the case 500 is placed about the electronic device 502. For example, the case 500 can cover or obstruct a display, a touch input device such as a trackpad or button, a sensor such as a camera, speakers, or an audio or headset port. In such embodiments, the electronic device 502 can adjust an operation or a characteristic of the I/O device 506 and/or the electronic device 502 based on the obstruction of the I/O device 506. As one example, the electronic device 502 can disable the I/O device 506 while the case 500 is placed about the electronic device 502.

Figure 6:
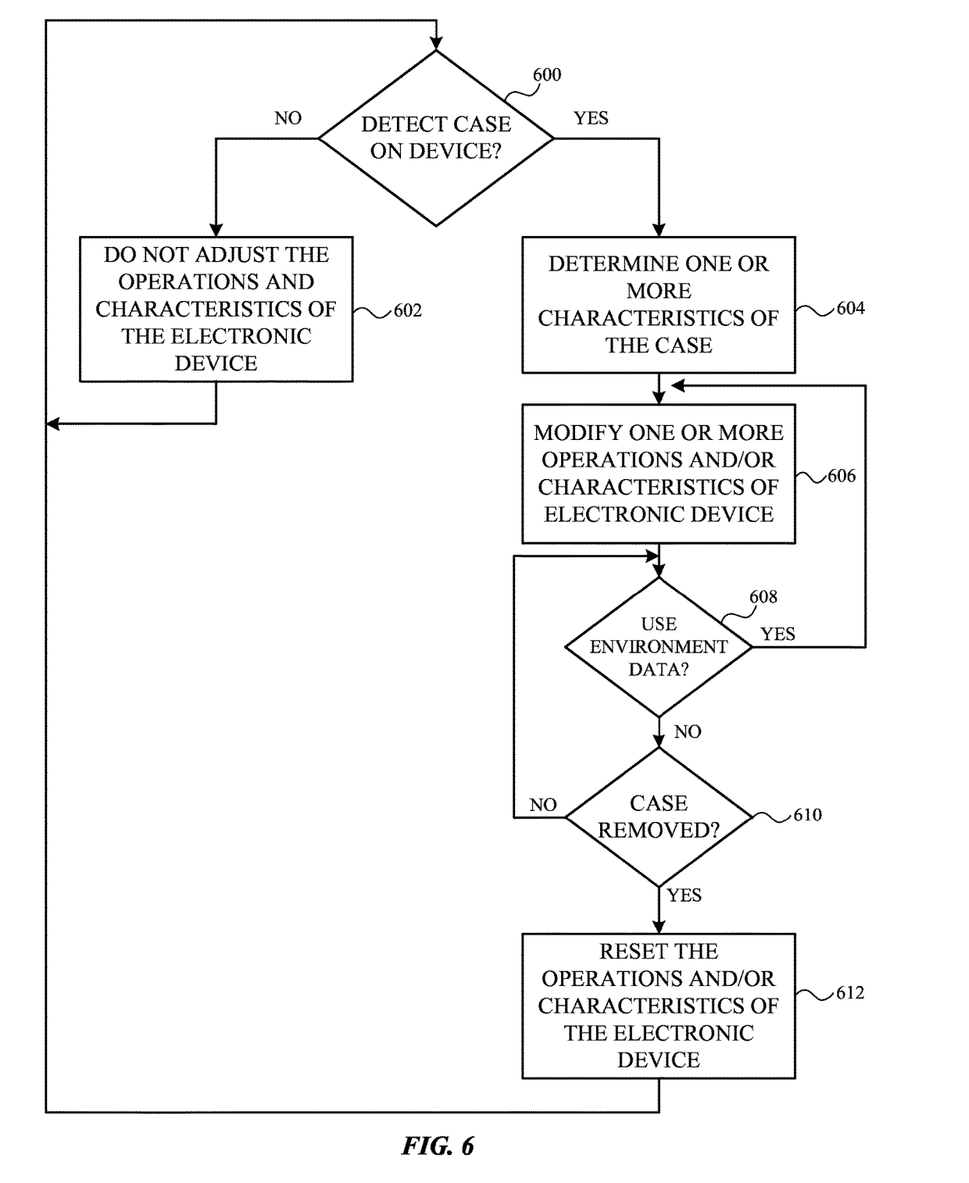
FIG. 6 is a flowchart of a first method of adjusting one or more device operations based on a case.

Referring now to FIG. 6, there is shown a flowchart of a first method of adjusting one or more device operations based on one or more characteristics of a case. Initially, as shown in block 600, a determination is made as to whether or not a case is detected on an electronic device. In one embodiment, the electronic device may be configured to detect the presence or absence of the case. As one example, the electronic device can include one or more conductive contacts and at least one of those contacts mates with, or contacts, a conductive contact on the case. A processing device, such as the processing device 402, may be configured to detect the contact between the conductive contacts. In another example, a case component in the case can be a wireless transceiver that transmits a signal to a network/communication interface (e.g., communication interface 412) in the electronic device. In yet another example, a case component can be one or more magnets and the device component a Hall Effect sensor.

If a case is not detected, the process passes to block 602 where the operations and characteristics of the electronic device are not adjusted. The electronic device continues to operate as it did prior to block 600. The method then returns to block 600.

If a case is detected at block 600, the process passes to block 604 where the electronic device determines one or more characteristics of the case. Example characteristics include, but are not limited to, the material of the case, the thickness of the case, whether the case at least partially covers or impedes device in the electronic device, and/or the configuration of the case (e.g., enclose electronic device completely or partially). Based on at least one characteristic of the case, the electronic device adjusts one or more operations of the electronic device (block 606). As described earlier, in one embodiment, the electronic device can adjust the thermal management operations of the electronic device when the material of the case is a material that has a lower thermal conductivity. The operating temperature of the electronic device can increase since the body part of the user (e.g., a hand) that contacts the electronic device and the case may not feel or detect the increased level of heat being generated by the electronic device.

Additionally or alternatively, the electronic device may adjust the thermal management operations of the electronic device when the device and case components form a heat sink that dissipates heat into the case. In such an embodiment, the device and case components can be positioned at a location on the electronic device that a user usually does not contact during operation of the electronic device.

Additionally or alternatively, the electronic device can adjust the volume or frequency spectrum of the audio based on the material of the case and/or the case at least partially impeding the speakers in the electronic device. The volume can be increased and/or the frequency spectrum of the audio playback shifted to improve the quality of the audio playback. Alternatively, the electronic device may disable the speakers while the case is on the electronic device. Similarly, the electronic device may adjust the volume, the frequency spectrum, or disable a microphone based on the material of the case and/or the case at least partially impeding the microphone.

Additionally or alternatively, the electronic device may adjust the operation of a touch device based on the type of case and/or the material of the case. For example, if the case is, or includes, a cover that is positioned over the display, and the display includes a touchscreen, the electronic device can decrease a touch threshold, or an amount of touch, that is needed to register on the touch screen. In other words, the operations of the touchscreen can be adjusted to make the touchscreen more sensitive to touch inputs. Alternatively, if the case is, or includes, a transparent cover or film, the electronic device can adjust the brightness and/or contrast of the display while the case is on the electronic device. Alternatively, if the case includes an opaque cover that is positioned over the display, the electronic device may disable the display (e.g., put in a sleep state) while the case is on the electronic device.

Additionally or alternatively, power consumption of the electronic device can be adjusted based on the presence of the case and/or a characteristic of the case. As one example, selectively deactivating components or functions within the electronic device can reduce the power consumption. Alternatively, based on the type of case that is positioned about the electronic device, the process of power reductions that may occur when multiple applications are running simultaneously in the electronic device can be extended since the heat transfer experienced by a user may be delayed.

Additionally or alternatively, at least one operation of a haptic device can be adjusted based on the presence and/or a characteristic of a case. As one example, the output level and/or the output frequency of the haptic device can increase when a case is positioned about the electronic device.

Additionally or alternatively, the electronic device may adjust the operation of a network/communication interface if the case component includes an antenna that provides or enhances a wireless communication link.

Additionally or alternatively, a case may include one or more magnets as case components and an electronic device a Hall Effect sensor as a device component. The Hall Effect sensor can detect at least one magnet in the case and based on such detection, determine one or more characteristics of the case. Based on at least one characteristic of the case, a processing device in the electronic device can adjust one or more operations of the electronic device. Additionally or alternatively, the directionality of the magnetic field may be used to drive one or more functions with the electronic device. For example, audio can be muted in the electronic device while the case is positioned about the electronic device. In another example, the electronic device can disable or turn off particular applications or operations when the directionality of the magnetic field changes. For example, a case can include a flap that covers the display when closed and folds over the electronic device and rests against the back of the electronic device when open. The orientation of one or more magnets in the flap changes based on whether the flap is open or closed. The changes in orientation can be detected by the Hall Effect sensor, and an application or operation in the electronic device can be enabled or disabled based on the orientation of the one or more magnets.

Additionally or alternatively, a data processing operation (e.g., a filtering function or a computation) in the electronic device can be adjusted by a processing device based on one or more characteristics of a case. For example, a noise cancellation algorithm can be modified based on a case type and/or the material of a case. For example, a noise cancellation algorithm may be disabled when a flap of a case covers (either partially or completely) a rear-facing microphone when the flap is in the open position. In another example, a noise cancellation algorithm may be adjusted when a thicker case muffles or shifts sound received by one microphone that ports through the case but minimally affects the sound received by another microphone that does not port through the case (e.g., a front-facing microphone).

Referring again to FIG. 6, after at least one operation of the electronic device is adjusted at block 606, a determination can be made as to whether environmental data is to be used to further adjust one or more operations of the electronic device. For example, an ambient light level measured by an ambient light sensor, a time stamp, or location information (e.g., indoor versus outdoor setting obtained from GPS data) obtained from an image sensor may be received by a processing device and used to further adjust the brightness of a display to further reduce the amount of power consumed by the display. Thus, an operation of the electronic device can be modified based on a determination of whether the electronic device is in a bright environment, a dimly lit environment, or in a darker environment. In another example, signals received from a position sensor (e.g., gyroscope) can be used to disable an application or an operation in the electronic device when the orientation of the electronic device is changed.

If environmental data is to be used to adjust at least one operation of the electronic device, the process returns to block 606 where the operation(s) is adjusted. If not, the method passes to block 610 where a determination may be made as to whether the case has been removed from the electronic device. As one example, the electronic device may detect the absence of the case due to the termination of a wireless communication link, or to the removal of a connector or conductive contact. If the case has not been removed, the process may return to block 608 and repeat until the case is removed. When the case is removed from the electronic device, the electronic device can reset the operations of the electronic device at block 612 to the state(s) that existed prior to the placement of the case onto the electronic device. The method then returns to block 600.

Figure 7:
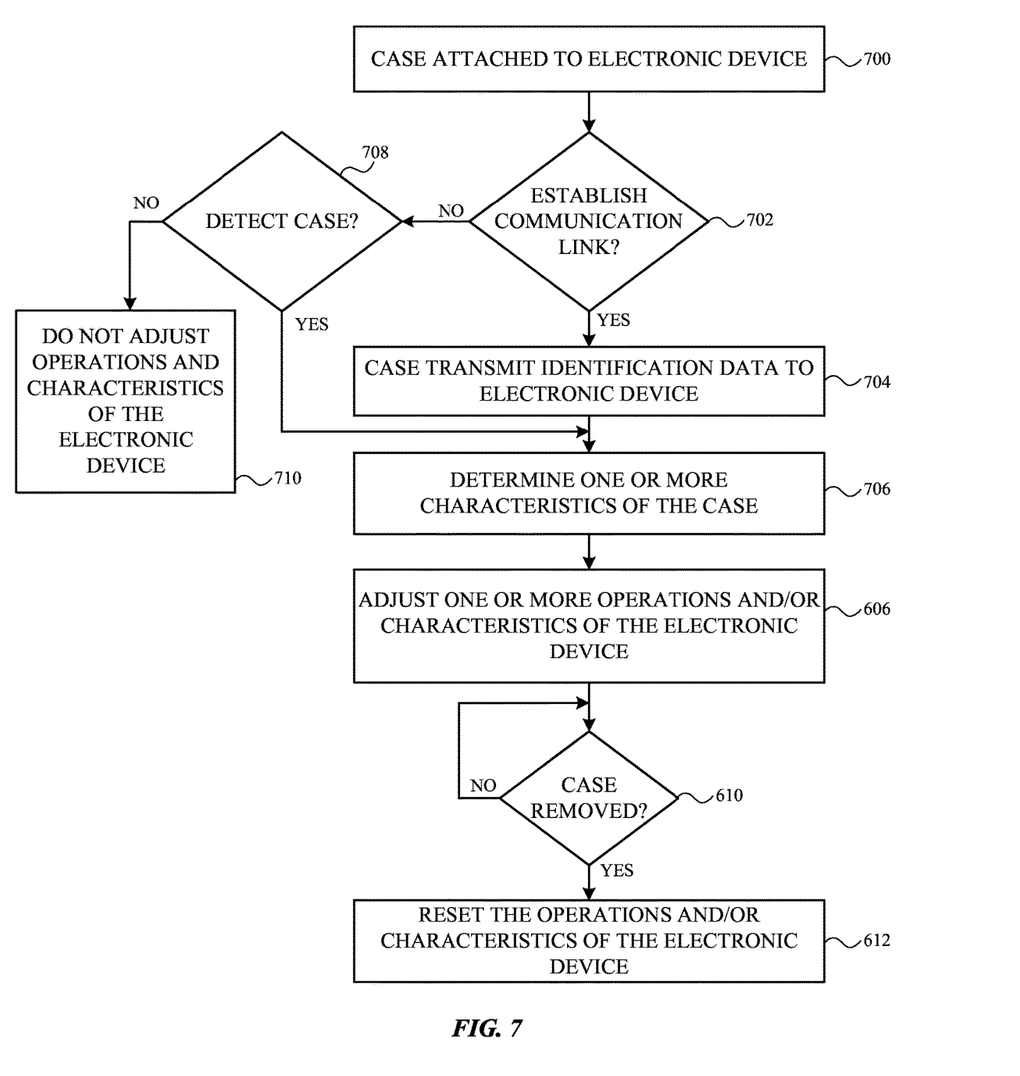
FIG. 7 is a flowchart of a second method of adjusting one or more device operations based on a case.

FIG. 7 is a flowchart of a second method of adjusting one or more device operations based on one or more characteristics of a case. Initially, as shown in block 700, a case is attached to the electronic device. A determination may then be made as to whether or not a communication link is established between the case and the electronic device (block 702). If so, the process continues at block 704 where the case transmits identification data to the electronic device. As one example, the case can transmit a part or model number, a device ID number, or a stock keeping unit (SKU) to the electronic device. Based on the received identification data, in one embodiment the electronic device may determine one or more characteristics of the case (block 706). As one example, a processing device in the electronic device (e.g., 402 in FIG. 4) may use the identification data to access a database that stores one or more characteristics of the case. The database can be stored in a memory in the electronic device (e.g., 404 in FIG. 4) or the database may be stored in an external device (e.g., a server) that the processing device accesses via a network communication interface (e.g., 412 in FIG. 4).

In another embodiment, the one or more characteristics of the case are determined at block 706 by having the case transmit the one or more characteristic to the electronic device when the case transmits the identification data to the electronic device.

Returning to block 702, if a communication link is not established the process passes to block 708. At block 708, a determination is made as to whether the electronic device detects the presence of the case. As one example, the electronic device includes one or more conductive contacts and at least one of those contacts mates with, or contacts, a conductive contact on the case. A processing device, such as the processing device 402, may be configured to detect the contact between the conductive contacts. In another example, a case component in the case can be a mechanical key or projection that is configured to be inserted or received by a corresponding aperture in the electronic device. A processing device may be configured to detect the insertion of the mechanical projection into the aperture.

If the electronic device does not detect the presence of the case, the method passes to block 710 where the operations of the electronic device are not adjusted. If the electronic device detects the presence of the case at block 708, or after one or more characteristics of the case are determined at block 706, the process continues at block 606. At block 606, the electronic device adjusts one or more operations in the electronic device based on at least one determined characteristic of the case. A determination may then be made at block 610 as to whether the case has been removed from the electronic device. The process waits if the case has not been removed. If the case has been removed, the method continues at block 612 where the electronic device resets the operations of the electronic device to the state(s) that existed prior to the placement of the case onto the electronic device. Blocks 606, 610, and 612 may be performed similar to the blocks shown in FIG. 6.

The methods shown in FIGS. 6 and 7 can each be performed differently in other embodiments. Additional blocks can be included in the process, or certain blocks may be omitted. For example, block 608 can be included in the method of FIG. 7. Additionally or alternatively, block 608 may be omitted from the method of FIG. 6.

Figure 8:
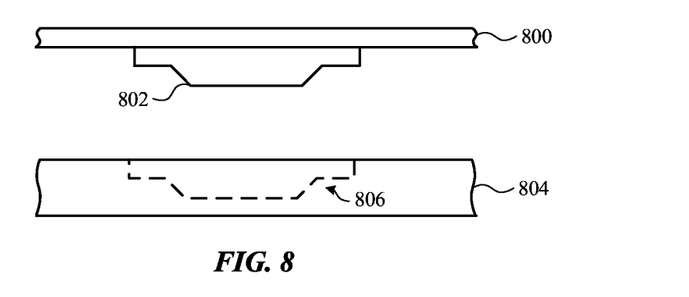
FIG. 8 is a simplified cross-sectional view of an electronic device and a case.

As described earlier, a device component and a case component can be mechanical components. Referring now to FIG. 8, there is shown a simplified cross-sectional view of an electronic device and a case. In this embodiment, the case component is a mechanical key or projection 802 that is attached or formed in the case 800. When the case is positioned on the electronic device 804, the mechanical key 802 is inserted into or received by an aperture 806 formed in the electronic device 804. A processing device in the electronic device can be configured to detect when the key is received by the aperture 806. As one example, the mechanical key 802 can activate a switch positioned within the aperture 806 when the mechanical key 802 is inserted into the aperture 806.

Figure 9:
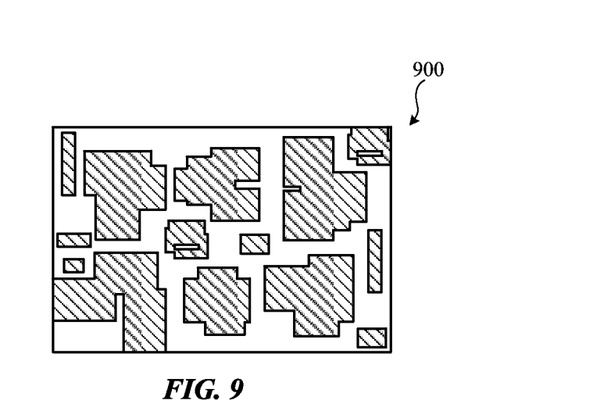
FIG. 9 illustrates a pattern or image that may be used to identify a case.

In some embodiments, the electronic device can identify the case based on an image or pattern included in or formed on or over the case. FIG. 9 illustrates a pattern that may be used to identify a case. In one embodiment, the pattern 900 includes shapes that have a different color or contrast from the case. An image sensor, such as a camera, can capture an image of the pattern and identify the case using the image. For example, an electronic device can store a database of different patterns and identifying information of the case associated with each pattern. Alternatively, the database may store a database of different patterns and one or more characteristics of the case associated with each pattern in the database. A processing device can determine if the pattern in the image matches a pattern in the database. Based on a match, the electronic device can either identify the type of case or determine one or more characteristics of the case. In some embodiments, the database may be stored in an external device, such as a server, that the electronic device accesses using a network communication interface (e.g., 412 in FIG. 4).

In another embodiment, the pattern can be a machine-readable optical label consisting of an array of dark and light squares, such as a barcode or matrix barcode. An image sensor can capture an image of the machine-readable optical label and identify the case by decoding the image using an application program. For example, an electronic device can execute the application program that processes the image of the machine-readable optical label. Using the application program and a network communication interface, the electronic device can identify the type of case and/or determine one or more characteristics of the case.

In some embodiments, the pattern 900 may be a collection of different shaped conductive contacts. An electronic device can include the pattern 900 of conductive contacts. The electronic device can identify the case based on the number, shape, and/or position of the case conductive contacts that mate with at least one of the conductive contacts in the pattern 900. For example, an electronic device can store a database of case conductive contact patterns and the identification data of the case associated with each pattern. Alternatively, the database may store a database of different case conductive contact patterns and one or more characteristics of a case associated with each pattern in the database. A processing device can determine if the case conductive contact pattern matches a pattern in the database. Based on a match, the electronic device can either identify the type of case or determine one or more characteristics of the case. In some embodiments, the database may be stored in an external device, such as a server, that the electronic device accesses using a network communication interface (e.g., 412 in FIG. 4).

In other embodiments, a case can include a pattern 900 of conductive contacts. The pattern 900 can be positioned on or proximate to a capacitive input device, such as a capacitive touchscreen. The conductive contacts in the pattern 900 can capacitively couple with the capacitive sensors in the capacitive input device, and an image of the pattern 900 may be produced. An electronic device can store a database of patterns and the identification data of a case associated with each pattern. Alternatively, the database may store a database of different patterns and one or more characteristics of a case associated with each pattern in the database. A processing device can determine if the pattern 900 matches a pattern in the database. Based on a match, the electronic device can either identify the type of case or determine one or more characteristics of the case. In some embodiments, the database may be stored in an external device, such as a server, that the electronic device accesses using a network communication interface (e.g., 412 in FIG. 4).

In some embodiments, a user can select which operations to adjust when a case is placed about the electronic device. A user may use a preference menu or a control panel to select the operations.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device, comprising:
    a device housing;
    a first plurality of electrical contacts arranged along an exterior surface of a sidewall of the device housing that is configured to mate with a second plurality of electrical contacts of a case when the case is positioned at least partially about the electronic device, the first plurality of electrical contacts being exposed at the exterior surface of the sidewall;
    an audio component: and
    a processing device configured to:
        detect a type of the case when the first plurality of electrical contacts are mated with the second plurality of electrical contacts; and in response to a detection of the type of the case, adjust an audio output of the audio component in accordance with the detected type of the case.

2. The electronic device as in claim 1, wherein a first one of the first plurality of electrical contacts is separated from a second one of the first plurality of electrical contacts by a portion of the exterior surface of the sidewall.

3. The electronic device as in claim 1, wherein an exterior-facing surface of a display component is oriented orthogonally with respect to an exterior facing surface of the first plurality of electrical contacts.

4. The electronic device as in claim 1, wherein mating the first plurality of electrical contacts with the second plurality of electrical contacts establishes a two-way communication channel between the case and the electronic device, wherein the case provides at least one characteristic of the case to the electronic device by way of the two-way communication channel.

5. The electronic device as in claim 1, wherein the first plurality of electrical contacts are configured to receive electrical energy from a battery of the case through one or more of the second plurality of electrical contacts.

6. The electronic device as in claim 1, wherein the processing device is further configured to receive environmental data and based on the environmental data adjust the visual output of a display component based on the environmental data.

7. A method of operating an electronic device, comprising:
detecting a type of a case when a first plurality of electrical contacts exposed at and forming a portion of an exterior surface of a sidewall of the electronic device mates with a second plurality of electrical contacts of the case; and
in response to the first plurality of electrical contacts mating with the second plurality of electrical contacts, adjusting an audio output of an audio component of the electronic device in accordance with the detected type of case.

8. The method as in claim 7, further comprising
adjusting a thermal management operation of the electronic device in response to the detection of the type of the case.

9. The method as in claim 7, wherein mating the second plurality of electrical contacts with the first plurality of electrical contacts establishes a two-way communication channel between the case and the electronic device, wherein the case provides at least one characteristic of the case to the electronic device by way of the two-way communication channel.

10. The method as in claim 7, wherein adjusting the audio output consists of adjusting the audio output from a first volume level to a second volume level greater than the first volume level.

11. The method as in claim 10, wherein adjusting the audio output comprises adjusting the audio output from a first volume level directly to a second volume level associated with a characteristic of the case.

12. The method as in claim 7, wherein adjusting an audio output of an audio component of the electronic device in accordance with the detected type of case comprises increasing an amount of volume output by the audio component based on the identified case type.

13. The method as in claim 7, wherein adjusting the audio output of the audio component comprises shifting a frequency spectrum of audio playback.

14. The method as in claim 7, further comprising:
receiving environmental data; and
adjusting a visual output of the display component or the audio output of the audio component based on the environmental data.

15. A system, comprising:
a case configured to be positioned at least partially about an electronic device, the case comprising a first plurality of electrical contacts; and
the electronic device comprising:
a second plurality of electrical contacts arranged at an exterior surface of a housing of the electronic device and configured to mate with the first plurality of electrical contacts, the second plurality of electrical contacts including first and second contacts exposed at the exterior surface of a sidewall of the housing;
an audio component; and
a processing device configured to:
detect a type of the case when the second plurality of electrical contacts are mated with the first plurality of electrical contacts; and
in response to a detection of the type of the case, adjust a volume of the audio component in accordance with the type of the case.

16. The system as in claim 15, wherein the processing device is further configured to disable a touch screen of the system while the case is positioned over a surface of the touch screen.

17. The system as in claim 15, wherein the processor is further configured to increase a touch threshold of a touch screen in response to the detection of the case.

18. The system as in claim 15, wherein a first one of the first plurality of electrical contacts is separated from a second one of the first electrical contacts by a portion of the exterior surface of the sidewall.

19. An electronic device, comprising:
a device component configured to mate with a case component of a case when the case is positioned at least partially about the electronic device;
an audio component; and
a processing device configured to:
detect the presence of the case when the device component is mated with the case component; and
in response to a detection of the presence of the case, adjust a frequency spectrum of one or more of: an audio output or an audio response of the audio component.

20. The electronic device as in claim 19, wherein the device component comprises one or more electrical contacts and the case component comprises one or more electrical contacts.

21. The electronic device as in claim 19, wherein the processing device is configured to adjust an amplitude of an audio signal received by the audio component to adjust the one or more of: the audio output or the audio response of the audio component.

22. The electronic device as in claim 19, wherein the processing device is configured to adjust a volume of an audio playback to adjust to adjust the one or more of: the audio output or the audio response of the audio component.

23. The electronic device as in claim 19, wherein the processing device is configured to mute an audio playback to adjust the one or more of: the audio output or the audio response of the audio component.

24. An electronic device, comprising:
a first plurality of electrical contacts arranged along an exterior surface of a sidewall of a device housing that is configured to mate with a second plurality of electrical contacts of a case when the case is positioned at least partially about the electronic device, the first plurality of electrical contacts including first and second contacts exposed at the exterior surface of the sidewall;

a camera component: and a processing device configured to:
  detect a type of the case when the first plurality of electrical contacts are mated with the second plurality of electrical contacts;
  determine whether the camera component is obstructed based on the detected case type; and
  in response to a determination that the camera component is obstructed change an operating mode of the camera.

\* \* \* \* \*